(12) United States Patent
Bizzarri et al.

(10) Patent No.: US 12,395,863 B2
(45) Date of Patent: Aug. 19, 2025

(54) SELF-ORGANIZING NETWORK SYSTEM

(71) Applicant: TELECOM ITALIA S.p.A., Milan (IT)

(72) Inventors: Simone Bizzarri, Turin (IT); Andrea Buldorini, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 453 days.

(21) Appl. No.: 17/635,940

(22) PCT Filed: Aug. 24, 2020

(86) PCT No.: PCT/EP2020/073659
§ 371 (c)(1),
(2) Date: Feb. 16, 2022

(87) PCT Pub. No.: WO2021/037812
PCT Pub. Date: Mar. 4, 2021

(65) Prior Publication Data
US 2022/0338029 A1    Oct. 20, 2022

(30) Foreign Application Priority Data
Aug. 27, 2019  (IT) .......................... 102019000015096

(51) Int. Cl.
*H04W 24/02* (2009.01)
*H04W 28/02* (2009.01)
*H04W 84/18* (2009.01)

(52) U.S. Cl.
CPC ....... *H04W 24/02* (2013.01); *H04W 28/0226* (2013.01); *H04W 84/18* (2013.01)

(58) Field of Classification Search
CPC .. H04W 24/02; H04W 28/0226; H04W 84/18
See application file for complete search history.

(56) References Cited

U.S. PATENT DOCUMENTS

2016/0164732 A1   6/2016   Suerbaum
2019/0116505 A1*  4/2019   Bhorkar .................. H04L 47/70
(Continued)

FOREIGN PATENT DOCUMENTS

WO    WO 2014/146690 A1    9/2014
WO    WO-2019034805 A1 *   2/2019   ........... H04L 41/145

OTHER PUBLICATIONS

62810268,Specification,Feb. 25, 2019 (Year: 2019).*
(Continued)

*Primary Examiner* — Ji-Hae Yea
(74) *Attorney, Agent, or Firm* — Oblon, McClelland, Maier & Neustadt, L.L.P.

(57) ABSTRACT

A self-organizing system for mobile communication optimization includes circuitry that collects external data related to an external event causing gathering of user equipment in a geographic area. The circuitry obtains spatial and time identifiers of the external event based on the external data in order to forecast data traffic due to the external event. The circuitry then generates a corresponding critical issues report identifying potential critical issues based on the data traffic forecast, and generates and enforces a network communication update based on the critical issues report.

17 Claims, 2 Drawing Sheets

(56) References Cited

U.S. PATENT DOCUMENTS

| | | | |
|---|---|---|---|
| 2019/0149425 A1* | 5/2019 | Larish | G06N 3/045 |
| | | | 706/16 |
| 2020/0077282 A1 | 3/2020 | Bhorkar et al. | |
| 2020/0186473 A1* | 6/2020 | Serrano Garcia | H04W 28/08 |
| 2020/0275334 A1* | 8/2020 | Visuri | H04W 36/324 |

OTHER PUBLICATIONS

International Search Report mailed on Oct. 6, 2020 in PCT/EP2020/073659 filed on Aug. 24, 2020.
Written Opinion mailed on Oct. 6, 2020 in PCT/EP2020/073659 filed on Aug. 24, 2020.

* cited by examiner

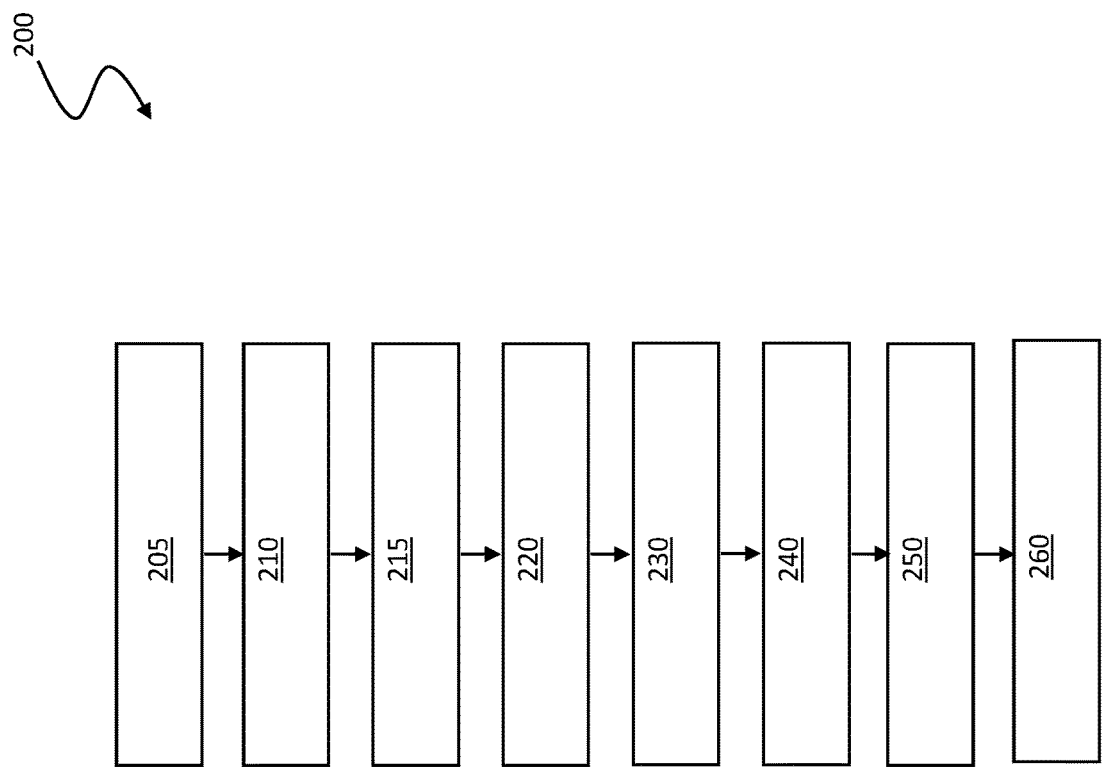

SELF-ORGANIZING NETWORK SYSTEM

BACKGROUND OF THE PRESENT INVENTION

Field of the Present Invention

The present invention generally relates to the communication network field. More particularly, the present invention relates to a Self-Organizing Network ("SON") system for the automatic optimization of mobile communication networks.

Overview of the Related Art

In the communication network field, a Self organizing network ("SON") system is a system configured to automatically optimize a mobile communication network, such as a 2G, 3G, 4G and 5G mobile communication network.

SON systems are configured to optimize a mobile communication network through load balancing, coverage and capacity, and mobility optimization functions. According to the solutions known in the art, said functions implemented by SON systems provide for monitoring the mobile communication network through collection and measurements of network-related data (hereinafter referred to as "internal network data") retrieved and/or generated and/or processed within the mobile communication network itself and relating to the mobile communication network (e.g, relating to the status of the mobile communication network). The internal network data relates to network configurations and/or performance and/or setting, such as for example measurements regarding network performances, call detail records, fault registrations, and fault alarms.

As the complexity and the size of modern mobile communication networks is continuously increasing, improved SON systems are required to increase the performances of the services offered by the mobile communication networks without having to increase the burden of human operators of the mobile communication networks.

For this purpose, different known solutions have been devised directed to increase the optimization performances of SON systems through an increase of the amount of internal network data retrieved from the mobile communication networks (see for example 3GPP technical specification *TS 28.628 Self-Organizing Networks (SON) Policy Network Resource Model (NRM) Integration Reference Point (IRP)*; Information Service (IS) (Release 15)).

U.S. Pat. No. 9,210,600 discloses a system for managing a cellular wireless communication network. The system comprises a data store that comprises cellular wireless communication performance metrics, a computer, and an application that is stored in a non-transitory memory of the computer and executed by the computer. The application receives a selection of base transceiver stations, retrieves metrics associated with the selected base transceiver stations from the data store, analyzes the metrics associated with the selected base transceiver stations, identifies a low usage base transceiver station that is one of the selected base transceiver stations, wherein the low usage base transceiver station is associated with a usage that is less than a predefined usage threshold, determines an average of an at least one metric based on the metrics of the selected base transceiver stations excluding the low usage base transceiver station, and transmits the average of the at least one metric.

In *Big Data Driven Knowledge Discovery for Autonomic Future Internet* by professor Geyong Min, Department of Mathematics and Computer Science, College of Engineering, Mathematics and Physical Sciences University of Exeter, U.K., available for example at the Internet webpage https://docplayer.net/3165186-Big-data-driven-knowledge-discovery-for-autonomic-future-internet.html, the concept of Automatic Future Internet ("AFI") oriented to 5G mobile networks is provided, i.e., an intelligent and automatic network configured to adapt itself to the variable traffic conditions through the collection and analysis of internal network performance data, as well as through data generated by Internet of Things ("IoT") sensors and/or provided by the users of the network.

Paper *Wireless communications in the era of big data* by Suzhi Bi, Rui Zhang, Zhi Ding, Shuguang Cui, IEEE Communications Magazine (Volume: 53, Issue: 10, October 2015, pages 190-199), discusses the challenges and opportunities in the design of scalable wireless systems to embrace the big data era. Instead of viewing mobile big data as an unwanted burden, methods are introduced to capitalize on the vast data traffic, for building a big-data-aware wireless network with better wireless service quality and new mobile applications.

White paper *Advanced predictive network analytics: Optimize your Network Investments & transform Customer Experience* by Ari Banerjee, Heavy reading, February 2014, discloses a solution based on predictive analysis for the managing of integrated data network owned by a communication operator.

SUMMARY OF THE PRESENT INVENTION

Applicant has observed that none of the solutions known in the art is capable of efficiently increasing the performances of the services offered by the mobile communication networks without having to increase the burden of human operators of the mobile communication networks.

In the known mobile communication networks having SON functionalities, the SON systems only exploit internal network data retrieved from the mobile communication network and regarding only the mobile communication itself. Therefore, the automatic optimization offered by said SON systems is only limited to the operation of the mobile communication network itself, and does not take into account of external events (i.e., external with respect to the mobile communication networks) that may influence the performance of the mobile communication network. On this regard, Applicant has found that one of the possible external events that may strongly influence the performance of a mobile communication network is the variation in number and position of users whose user equipment (e.g., smartphones) are attached to the mobile communication network when the users form gatherings because of occurrences of public happenings, such as for example artistic/entertaining performances, cultural exhibitions, theatrical plays, sport contests, concerts, movies, demonstrations, and so on.

The solution disclosed in U.S. Pat. No. 9,210,600 is mainly directed to offer customer care solutions, and to make forecast analysis about variations in the Quality of Experience ("QoE") of the user. In U.S. Pat. No. 9,210,600, no particular effort has been made directed to the optimization of the mobile communication network.

The solution proposed by professor Geyong Min is mainly based on processing of internal network data and data acquired through IoT sensors.

The paper *Wireless communications in the era of big data* is simply directed to approaches for the design of properly scalable wireless networks in order to face the increase in the data traffic.

The solution disclosed in *Advanced predictive network analytics: Optimize your Network Investments & transform Customer Experience* is simply aimed at managing network resources more efficiently and based on different requirements and expectations of the users of the network.

In view of the above, Applicant has devised a SON system which is capable of optimizing the mobile communication network in a more efficient way compared to the known solutions.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present that applies mutatis mutandis to any other aspect thereof).

An aspect of the present invention relates to a self-organizing system for the automatic optimization of a mobile communication network.

According to an embodiment of the invention, the self-organizing system comprises a first unit configured to collect external data relating to an external event causing gathering of users of user equipment attached to the mobile communication network in a geographical location wherein said external event is scheduled to occur or is occurring.

According to an embodiment of the invention, said external data comprises data generated and collected outside and independently from the mobile communication network.

According to an embodiment of the invention, said external data comprises data regarding locations of user equipment attached to the mobile communication network obtained from the mobile communication network or through the mobile communication network.

According to an embodiment of the invention, the self-organizing system further comprises a second unit configured to process the collected external data to obtain spatial and time identifiers of said external event and to obtain a corresponding mobile communication network data traffic forecast which is likely to be caused by the occurrence of said external event.

According to an embodiment of the invention, the self-organizing system comprises a third unit configured to correlate said spatial and time identifiers, and said data traffic forecast, with internal network data retrieved and/or generated and/or processed within the mobile communication network and relating to the mobile communication network in order to generate a corresponding network critical issues report listing potential critical issues that can affect the mobile communication network because of data traffic variations caused by the gathering of users of user equipment attached to the mobile communication network when the external event will occur or is occurring.

According to an embodiment of the invention, the self-organizing system comprises a fourth unit configured to generate a network configuration update in response to said network critical issues report.

According to an embodiment of the invention, the self-organizing system further comprises a fifth unit configured to enforce said network configuration update on the mobile communication network.

According to an embodiment of the present invention, the second unit is configured to process the collected external data to obtain, from said data relating locations of user equipment attached to the mobile communication network, an indication of a gathering of the users of user equipment attached to the mobile communication network in the geographical location wherein said external event is scheduled to occur or is occurring.

According to an embodiment of the invention, said internal network data comprises performance data regarding performance of the mobile communication network and configuration data regarding the configuration of the mobile communication network.

According to an embodiment of the invention, said third unit comprises a first sub-unit configured to identify nodes of the mobile communication network which will be influenced by said external event and to identify when said nodes will be influenced by said external event based on a correlation of said spatial and time identifiers with said configuration data.

According to an embodiment of the invention, said third unit comprises a second sub-unit configured to characterize from the performance point of view said nodes identified by the first sub-unit by exploiting said performance data.

According to an embodiment of the invention, said third unit comprises a third sub-unit configured to generate said network critical issues report by correlating the characterization of the nodes carried out by the second sub-unit with said data traffic forecast.

According to an embodiment of the invention, said external data comprise at least one among:
  event identification data comprising a list of external events and the kind/typology of each listed external event;
  event time data, comprising for each external event at least one among the date, the starting time and the expected duration of the external event;
  event geographical data, comprising for each external event at least one among the geographical location where the external event is scheduled to occur, the size of the area interested by external event, the capacity thereof, data about traffic/road conditions and/or public transportation useful for reaching/leaving the external event location;
  event attendee data, comprising for each external event the expected number of attendees;
  attendee type data, comprising for each external event a (e.g., characterization) of the typology of the attendees, for example according to a useful criterion;
  historical data, comprising for each external event information relating at least one between the type and number of attendees at past occurrences of the same external event;
  social network data, comprising for each external event social network information relating to said external event;
  weather forecast data, comprising information relating to forecasted weather.

According to an embodiment of the invention, said spatial and time identifiers comprises at least one between:
  an area indicator adapted to spatially identify a geographical area wherein said external event will occur;
  a time indicator adapted to temporally identify said external event.

According to an embodiment of the invention, said data traffic forecast for the mobile communication network comprises at least one among:
  data traffic volume over the mobile communication network relating to said external event;
  geographical distribution of said data traffic;

kind of services requested to the mobile communication network by users of user equipment attached to the mobile communication network when the external event will occur;

expected quality of service requested when the external event will occur;

uplink and downlink bit rate caused by traffic relating to said external event.

According to an embodiment of the invention, said network critical issues report includes at least one among:

load unbalance of data traffic among nodes of the mobile communication network interested by said external event;

saturation of network resources caused by data traffic generated during the occurrence of said external event;

quality of service deterioration caused by said external event.

According to an embodiment of the invention, said network configuration update comprises at least one among:

updating of antenna parameters directed to modify cell coverage in the mobile communication network;

updating of handover thresholds directed to balance traffic load in the mobile communication network;

adding/activating new network nodes in/of the mobile communication network;

activating new transmission frequencies for nodes of the mobile communication network.

According to an embodiment of the invention said performance data comprises at least one among throughput, delay data, key performance indicators of the mobile communication network.

According to an embodiment of the invention, said configuration data comprises at least one among data relating to position of nodes of the mobile communication network, data relating to availability and distribution of current and potential available mobile communication network resources, data regarding the location, number, size and/or position of antennas of nodes of the mobile communication network, priority data, radio related parameters, and data relating to handover relations.

Another aspect of the present invention relates to a method for the automatic optimization of a mobile communication network.

According to an embodiment of the invention, the method comprises collecting external data relating to an external event causing gathering of users of user equipment attached to the mobile communication network in a geographical location wherein said external event is scheduled to occur or occurring.

According to an embodiment of the invention, said external data comprises at least one of:

data being is generated and collected outside and independently from the mobile communication network, and data regarding locations of user equipment attached to the mobile communication network, obtained from or through the mobile communication network.

According to an embodiment of the invention, the method comprises processing the collected external data to obtain spatial and time identifiers of said external event and to obtain a corresponding mobile communication network data traffic forecast which will be likely to be caused by the occurrence of said external event.

According to an embodiment of the invention, the method comprises correlating said spatial and time identifiers, and said data traffic forecast, with internal network data retrieved and/or generated and/or processed within the mobile communication network and relating to the mobile communication network in order to generate a corresponding network critical issues report listing potential critical issues that can affect the mobile communication network because of data traffic variations caused by the gathering of users of user equipment attached to the mobile communication network when the external event will occur or is occurring.

According to an embodiment of the invention, the method comprises generating a network configuration update in response to said network critical issues report.

According to an embodiment of the invention, the method comprises enforcing said network configuration update on the mobile communication network.

According to an embodiment of the invention, said internal network data comprises performance data regarding performance of the mobile communication network and configuration data regarding the configuration of the mobile communication network.

According to an embodiment of the invention, said correlating said spatial and time identifiers, and said data traffic forecast, with internal network data retrieved/generated from/by the mobile communication network comprises performing the following sequence of operations:

a) identifying nodes of the mobile communication network which will be influenced by said external event and identifying when said nodes will be influenced by said external event based on a correlation of said spatial and time identifiers with said configuration data;

b) characterizing from the performance point of view said nodes identified in operation a) by exploiting said performance data;

c) generating said network critical issues report by correlating the characterization of the nodes carried out in operation c) with said data traffic forecast.

BRIEF DESCRIPTION OF THE DRAWINGS

These and other features and advantages of the present invention will appear more clearly by reading the following detailed description of exemplary and non-limitative embodiments thereof. For its better intelligibility, the following description should be read making reference to the attached drawing, wherein:

FIG. 2 is a flow chart illustrating main operations carried out by the SON system of FIG. 1.

Figure 1:
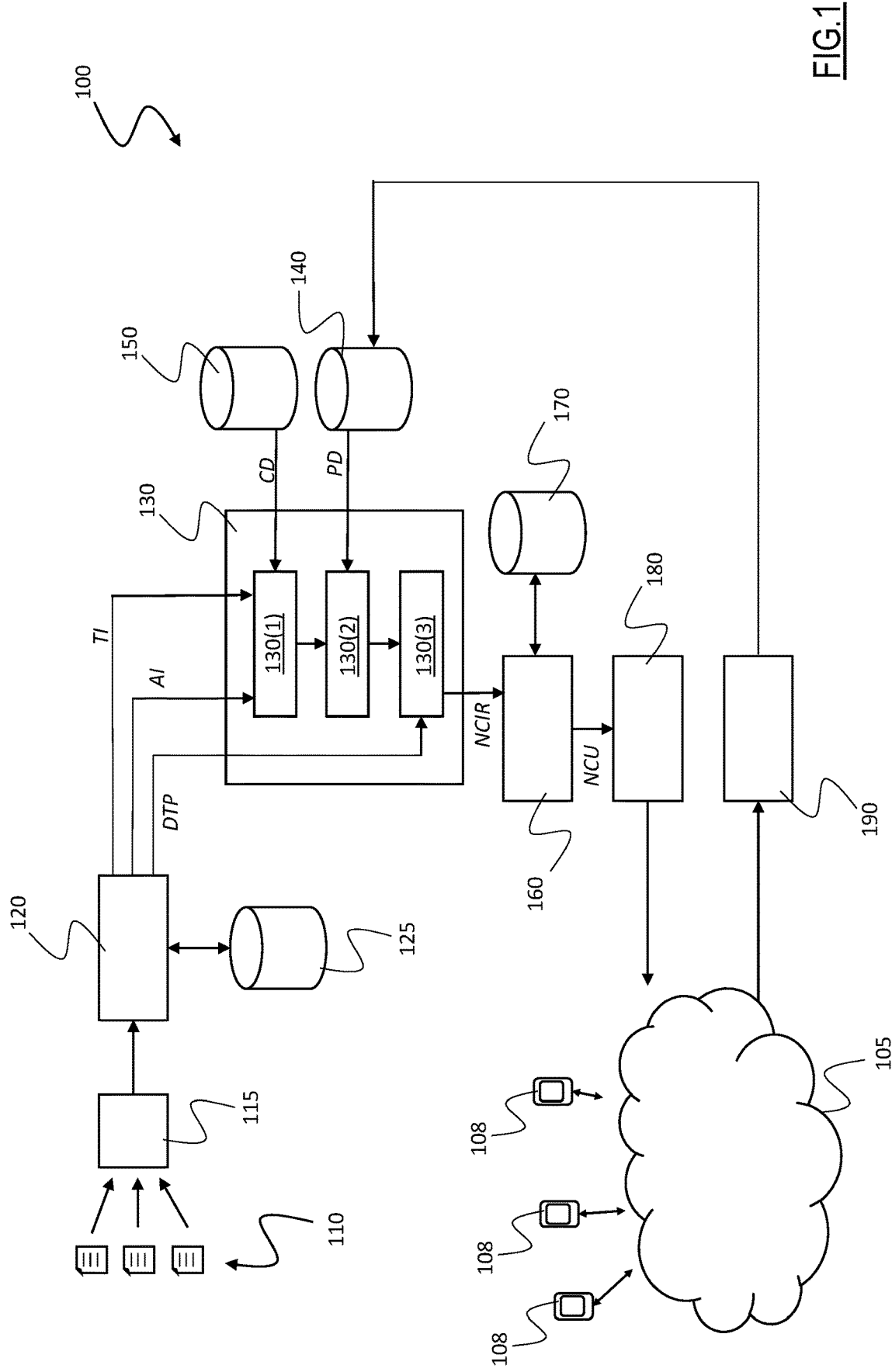
FIG. 1 is a schematic representation of a SON system 100 according to an embodiment of the present invention.

DETAILED DESCRIPTION OF EXEMPLARY AND NON-LIMITATIVE EMBODIMENTS OF THE PRESENT INVENTION

With reference to the drawing, FIG. 1 is a schematic representation of a SON system 100 configured to automatically optimize a mobile communication network 105 according to an embodiment of the present invention.

The concepts of the present invention can be applied independently from the architecture of the mobile communication network 105. For example, the mobile communication network 105 can be a 2G, 3G, 4G or a 5G mobile communication network.

An embodiment of the present invention provides a SON system with the function of collecting external data which comprises data that are generated and collected outside and independently from the mobile communication network 105 and correlating such data with internal network data retrieved and/or generated and/or processed within the mobile communication network 105 and relating to the mobile communication network to configure the mobile communication network 105. In this way, the performances of the mobile communication network 105 can be optimized by taking into account not only the internal status of the mobile communication network 105, but also external events that may influence the performance of the mobile communication network 105.

According to an embodiment of the present invention, said external events that may influence the performance of the mobile communication network 105 are for example localized public happenings which cause gathering of users of user equipment ("UE") 108 (e.g., smartphones) attached to the mobile communication network 105 in the geographical location wherein such public happenings are occurring. Non limitative examples of external events of this kind include artistic/entertaining performances, cultural exhibitions, theatrical plays, sport contests, concerts, movies, demonstrations.

According to an embodiment of the present invention, said external data which are generated and collected outside and independently from the mobile communication network 105 may comprise a large amount of (possibly, uneven, heterogeneous) different data relating to said external events. This external data, globally identified in FIG. 1 with reference 110, are descriptor data that identify, locate, characterize and generally describe said external events.

According to an embodiment of the present invention, the external data 110 generated and collected outside and independently from the mobile communication network 105 may comprise at least one (preferably at least a subset) of the following kinds of descriptor data:

Event identification data, comprising for example a list of external events (e.g., in the form of an event calendar) and the kind/typology of each listed external event (e.g., artistic events, sport events, political events, cultural events, entertainment events and so on);

Event time data, comprising for example for each external event the date, the starting time and the expected duration of the external event;

Event geographical data, comprising for example for each external event the geographical location where the external event is scheduled to occur, the size of the area interested by external event (e.g., a city square, an arena, a stadium), the capacity (in terms of number of people) thereof, data about traffic/road conditions and/or public transportation useful for reaching/leaving the external event location;

Event attendee data, comprising for example for each external event the expected number of attendees (e.g., based on ticket bookings);

Attendee type data, comprising for example for each external event a (e.g., characterization) of the typology of the attendees, for example according to a useful criterion (e.g., teenagers, families, professionals, and so on);

Historical data, comprising for example for each external event information relating the type and number of attendees at past editions/occurrences of the same event;

Social network data, comprising for example for each external event social network information relating to said external event, from which it is possible to obtain an estimate of the attendees;

Weather forecast data, comprising for example information relating to the forecasted weather which may influence the number of attendees at the external events.

According to an embodiment of the present invention, the SON system 100 preferably comprises an external data collection module 115 configured to collect the external data 110, for example from (e.g. open data) internet web sites and social networks.

It has to be appreciated that in the present description, the terms "module" and "unit" are intended to emphasize functional (rather than implementation) aspects thereof. Each module/unit of the SON system 100 which will be described herein may be implemented by software, hardware, and/or a combination thereof. Moreover, the modules and units may also reflect, at least conceptually, the physical structure of the SON system 100.

According to an embodiment of the present invention, the SON system 100 comprises an external data analysis module 120 configured to analyze and correlate the external data 110 collected through the external data collection module 115 in order to:

generate an area indicator AI, which spatially identifies, for example in terms of position, shape and size, the geographical area wherein an external event will occur, generate a time indicator TI, which temporally identifies, for example, in terms of date, starting/ending time, and/or duration, the external event, determine a corresponding data traffic forecast DTP about the mobile communication network 105 data traffic which is expected to be caused by the attendees at the considered external event.

According to an embodiment of the present invention, said data traffic forecast DTP may comprise at least one among (and preferably at least a subset of):

data traffic volume over the mobile communication network 105 relating to the considered external event;

geographical distribution of said data traffic;

kind of services requested to the mobile communication network by the attendees at the considered external event;

expected Quality of Service of the services requested during the considered external event;

uplink and downlink bit rate caused by traffic relating to the considered external event.

According to an exemplary embodiment of the present invention, the external data analysis module 120 may be configured to generate the area indicator AI, time indicator TI, and the data traffic forecast DTP by processing the external data 110 through clustering methods exploiting correlations based on traffic generation characteristics, services and/or quality related data. For example, said clustering methods may be configured to highlight services types and characteristics thereof (e.g., maximum bit rate in uplink and/or in downlink, uplink/downlink relation types).

For example, if the external event is a rap music concert, the attendees will be generally young people which will use multimedia contents sharing services requiring high maximum bitrates in uplink.

For example, according to an exemplary embodiment of the present invention, the external data 110 used by the analysis module 120 to generate the area indicator AI may comprise the Event geographical data, the external data 110 used by the analysis module 120 to generate the time indicator TI may comprise the Event time data, the external data 110 used by the analysis module 120 to generate the data traffic forecast DTP may comprise at least one among the Event identification data, Event attendee data, Attendee type data, Historical data, social network data, Weather forecast data.

According to an embodiment of the present invention, the results of the analysis carried out by the external data analysis module 120—e.g., the area indicator AI, the time indicator TI and the data traffic forecasts DTP—relating to the considered external event may be stored in an external event repository module 125, for example a database.

In this way, it is possible to keep saved in the external event repository module 125 the results of analysis carried out for past external events. For example, according to an embodiment of the present invention, the event repository module 125 may store for each past external event, a corresponding area indicator AI, time indicator TI and data traffic forecast DTP previously calculated by the external data analysis module 120.

According to an embodiment of the present invention, these analysis results relating to past external events which are stored in the event repository module 125 can be advantageously exploited by the external data analysis module 120 to improve the reliability of the analysis carried out for a currently considered external event.

According to an embodiment of the present invention, the SON system 100 further comprises a data correlation module 130 configured to correlate the area indicator AI, the time indicator TI and the data traffic forecasts DTP output by the external data analysis module 120 with internal network data retrieved and/or generated and/or processed within the mobile communication network 105 and relating to the mobile communication network (e.g, relating to the status of the mobile communication network) to determine a corresponding network critical issues report NCIR listing possible critical issues that can affect the mobile communication network 105 because of the data traffic variation generated by attendees at external events.

According to an embodiment of the present invention, the critical issues that may be listed in the network critical issues report NCIR may include at least one among:
  not homogeneity (i.e., load unbalance) of data traffic among nodes of the mobile communication network 105 interested by the considered external event;
  saturation of network resources caused by data traffic generated during the occurrence of the considered external event;
  QoS deterioration caused by the considered external event.

According to an embodiment of the present invention, the internal network data relating the (e.g., status of) the mobile communication network 105 used by the data correlation module 130 for generating the network critical issues report NCIR comprise at least one between performance data PD regarding performance of the mobile communication network 105 and configuration data CD regarding the configuration of the mobile communication network 105 and of the nodes thereof.

The performance data PD regarding performance of the mobile communication network 105 may comprise for example throughput, delay data, and Key Performances Indicators ("KPI") (e.g., differentiated accessibility per service type, handover failure, throughput per service type, cut-offs). The performance data PD may be for example generated by taking into account historical performance data analysis made taking into account user services, network performances and network configurations.

The configuration data CD regarding the configuration of the mobile communication network 105 and of the nodes thereof may comprise for example at least one among data relating to the positions of the nodes of the mobile communication network 105, data relating to the availability and distribution of current and potential available resources (e.g., bandwidth), data regarding the location, number, size and/or position of the antennas of the nodes of the mobile communication network 105, priority data, radio related parameters, data relating to handover relations. For example, the data regarding the location may be derived from geo-related data used in the radio access network planning phase.

The performance data PD are preferably stored in a dedicated network performance database 140 and the configuration data CD are preferably stored in a dedicated network inventory database 150. However, similar considerations apply if the performance data PD and the configuration data CD are stored in different databases, such as in a same database.

According to an embodiment of the present invention, the data correlation module 130 comprises a first sub-module 130(1), a second sub-module 130(2) and a third sub-module 130(3).

According to an embodiment of the present invention, the first sub-module 130(1) is configured to identify which nodes of the mobile communication network 105 will be influenced by an external event, i.e., the nodes whose cells cover portions of the geographical area wherein the external event will occur, and when, by correlating the area indicator AI and the time indicator TI generated by the external data analysis module 120 with the configuration data CD.

According to an embodiment of the present invention, the second sub-module 130(2) is configured to characterize each node among the nodes of the communication network 105 identified by the first sub-module 130(1) from the performance point of view, by exploiting the performance data PD. For example, according to an embodiment of the present invention, the nodes are characterized by means of KPI statistics, such as for example differentiated accessibility per service type, handover failure, throughput per service type, and/or cut-offs.

According to an embodiment of the present invention, the third sub-module 130(3) is configured to generate the network critical issues report NCIR (which lists possible critical issues that can affect the mobile communication network 105) by correlating the node characterizations carried out by the second sub-module 130(2) with the data traffic forecasts DTP output by the external data analysis module 120. For example, performance aspects regarding the nodes are highlighted, such as for example node hardware aspects from communication resource point of view, node configurations (e.g., thresholds, priorities), and relationships among neighbour nodes.

The SON system 100 further comprises a network configuration module 160 configured to receive from the data correlation module 130 the network critical issues report NCIR, and to generate a corresponding network configuration update NCU adapted to solve, or at least mitigate, the critical issues listed in the network critical issues report NCIR when the network configuration update NCU is applied to the mobile communication network 105.

Without entering into details well known to those skilled in the field of SON networks, said network configuration update NCU comprises a list of updates and modifications to be applied to the current configuration of the mobile communication network 105, such as for example one or more among:
  updating of antenna parameters directed to modify cell coverage;

updating of handover thresholds directed to balance traffic load;

adding/activating new network nodes;

activating new transmission frequencies.

According to an embodiment of the present invention, the network configuration update NCU generated by the network configuration module 160 is advantageously stored in a network configuration database 170 in order to be applied to the mobile communication network 105 when the external event is occurring. In this way, a network configuration update history is generated.

Moreover, according to an embodiment of the present invention, by keeping past network configuration updates NCU stored in the network configuration database 170 in the form of a network configuration update history, it is possible to advantageously exploit them for improving the performances of the network configuration module 160 in the generation of new network configuration updates NCU, such as for example when an external event—similar to a past one already analyzed—is identified to occur.

The SON system 100 further comprises an enforcer module 180 adapted to apply the network configuration update NCU generated by the network configuration module 160 to the mobile communication network 105 during the occurrence of the external event according to one of the SON procedures well-known in the art.

Advantageously, the SON system may also comprise a monitor module 190 adapted to monitor the performance of the mobile communication network 105 during the occurrence of the external event, and to accordingly store in the network performance database 140 performance data PD regarding the performance of the nodes of the mobile communication network 105 involved by such external event. In this way, the network performance database 140 may be advantageously enriched with data regarding the performances (e.g., KPIs) of the (involved) nodes of the mobile communication network 105 measured during past external events. These data can be advantageously exploited for improving performance of the SON system 100 in relation to future external events.

FIG. 2 is a flow chart 200 illustrating the main operations carried out by the SON system 100 according to an embodiment of the present invention.

The SON system 100 collects external data 110 through the external data collection module 115 (phase 205), for example by searching/exploring/browsing/inspecting/monitoring internet web sites, open data databases, social networks and the like. This operation can be carried out periodically, in response to an explicit operator request, and/or continuously. Data on future external events can also be input in the data collection system module 115 asynchronously, when the information becomes available.

The collected external data is then analysed and correlated by the external data analysis module 120 in order to assess the occurrence of future external events, and generate for each external event that will occur in the future (or for at least a part thereof) a corresponding area indicator AI, a time indicator TI and a data traffic forecast DTP (block 210) identifying and describing the external event. Advantageously, said area indicators AI, time indicators TI and data traffic forecasts DTP can be also stored in the event repository module 125.

At this point, according to an embodiment of the present invention, the data correlation module 130 correlates the area indicator AI, the time indicator TI and data traffic forecast DTP (obtained from external data) corresponding to an external event with the configuration data CD and the performance data PD (internal data) in order to generate a corresponding network critical issues report NCIR which lists possible critical issues which could affect the mobile communication network 105 during the occurrence of said external event (blocks 215, 220, 230).

For this purpose, according to an embodiment of the present invention:

the first sub-module 130(1) identifies which nodes of the mobile communication network 105 will be influenced by said external event—and when—by correlating the corresponding area indicator AI and time indicator TI with the configuration data CD (block 215);

the second sub-module 130(2) characterizes the nodes identified at block 215 from the performance point of view by exploiting the performance data PD (block 220), and the third sub-module 130(2) generates the network critical issues report NCIR by correlating the node characterizations carried out at block 220 with the data traffic forecasts DTP (block 225).

At this point, the network configuration module 160 generates a network configuration update NCU directed to face the issues listed in the generated network critical issues report NCIR using one of the SON procedures already known in the art (block 240). Advantageously, said network configuration update NCU can be also stored in the network configuration database 170 in the form of a network configuration update history.

The network configuration update NCU generated at block 240 is then applied to the mobile communication network 105 by the enforcer module 180 during the occurrence of the external event according to one of the SON procedures already known in the art (block 250).

According to an embodiment of the present invention, the monitor module 190 monitors the performance of the mobile communication network 105 during the occurrence of the external event and stores in the network performance database 140 performance data PD relating to the performance of the nodes of the mobile communication network 105 involved by the external event.

In the embodiments of the invention described above, the SON system 100 is configured to generate the area indicator AI, time indicator TI, and the data traffic forecast DTP by processing external data 110 that comprises data generated and collected outside and independently from the mobile communication network 105.

According to another embodiment of the invention, in addition to, or in place of, said data generated and collected outside and independently from the mobile communication network 105, the external data 110 comprises data obtained from or through the mobile communication network 105 regarding locations of UE 108 attached to the mobile communication network 105.

According to an embodiment of the present invention, the external data analysis module 120 is configured to collect said data regarding locations of UE 108 attached to the mobile communication network 105, and process them to obtain an indication of a gathering of the users of UE 108 attached to the mobile communication network 105 in the geographical location wherein an external event is scheduled to occur or is occurring, for example using a crowd counting technique for counting or estimating the number of persons in a crowd that exploits UE location data, such as for example one of the techniques described in one of the European patent applications EP3241368, EP3278579, EP3278580 of the same Applicant.

According to this embodiment of the invention, the external data analysis module 120 is configured to generate the area indicator AI, the time indicator TI, and the data traffic forecast DTP by exploiting (e.g., also) the indication of a gathering of the users of UE 108 obtained through the processing of said data regarding locations of UE 108 attached to the mobile communication network 105.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the SON system 100 has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, the modules of the SON system 100 may be implemented by physical machines, virtual machines running on one or more physical servers, and/or virtual machines in a cloud computing environment.

The invention claimed is:

1. A self-organizing system for automatic optimization of a mobile communication network, comprising:
    circuitry configured to
        collect external data relating to an external event causing gathering of users of user equipment attached to the mobile communication network in a geographical location wherein said external event is scheduled to occur or is occurring, wherein said external data comprises at least one of:
            data being generated and collected outside and independently from the mobile communication network, and
            data regarding locations of user equipment, attached to the mobile communication network, obtained from or through the mobile communication network;
        process the external data that has been collected to obtain spatial and time identifiers of said external event and to obtain a corresponding mobile communication network data traffic forecast which is likely to be caused by occurrence of said external event;
        correlate said spatial and time identifiers, and said data traffic forecast, with internal network data retrieved and/or generated and/or processed within the mobile communication network and relating to the mobile communication network, in order to generate a corresponding network critical issues report listing potential critical issues that can affect the mobile communication network because of data traffic variations caused by the gathering of users of user equipment attached to the mobile communication network when the external event will occur or is occurring;
        generate a network configuration update in response to said network critical issues report; and
        enforce said network configuration update on the mobile communication network, wherein:
            the circuitry is configured to identify nodes of the mobile communication network that will be influenced by the external event and to identify when the identified nodes will be influenced by the external event, based on a correlation of the spatial and time identifiers with configuration data indicating configuration of the mobile communication network;
            the network critical issues report lists the potential critical issues including:
                a determination of future load unbalance of data traffic forecasted among the identified nodes of the mobile communication network interested by said external event,
                a future saturation of network resources caused by data traffic forecasted to be generated during the occurrence of said external event, and
                a future quality of service deterioration caused by said external event; and
            the data traffic forecast includes an expected quality of service to be requested, by user equipment from the mobile communication network, when the external event will occur.

2. The self-organizing system of claim 1, wherein the circuitry is configured to process the external data to obtain, from said data regarding locations of user equipment attached to the mobile communication network, an indication of a gathering of the users of user equipment attached to the mobile communication network in the geographical location wherein said external event is scheduled to occur or is occurring.

3. The self-organizing system of claim 1, wherein said internal network data comprises performance data regarding performance of the mobile communication network and the configuration data indicating the configuration of the mobile communication network.

4. The self-organizing system of claim 3, wherein the circuitry is configured to
    characterize from a performance point of view said nodes identified by the circuitry by exploiting said performance data; and
    generate said network critical issues report by correlating the nodes that have been characterized by the circuitry with said data traffic forecast.

5. The self-organizing system of claim 1, wherein said data being generated and collected outside and independently from the mobile communication network comprise at least one of:

event identification data comprising a list of external events and a kind/typology of each listed external event;
event time data comprising, for each external event, at least one of date, starting time, and expected duration of the external event;
event geographical data comprising, for each external event, at least one of geographical location where the external event is scheduled to occur, size of an area interested by the external event, capacity thereof, data about traffic/road conditions and/or public transportation for reaching/leaving the geographical location of the external event;
event attendee data comprising, for each external event, expected number of attendees;
attendee type data comprising, for each external event, typology of the attendees;
historical data comprising, for each external event, information relating at least one of type and number of attendees at past occurrences of the same external event;
social network data comprising, for each external event, social network information relating to said external event; and
weather forecast data, for each external event, comprising information relating to forecasted weather.

6. The self-organizing system of claim 1, wherein said spatial and time identifiers comprises at least one of:
an area indicator adapted to spatially identify a geographical area wherein said external event will occur; and
a time indicator adapted to temporally identify said external event.

7. The self-organizing system of claim 1, wherein said data traffic forecast for the mobile communication network further comprises at least one of:
data traffic volume over the mobile communication network relating to said external event;
geographical distribution of said data traffic;
kind of services requested to the mobile communication network by users of user equipment attached to the mobile communication network when the external event will occur; and
uplink and downlink bit rate caused by traffic relating to said external event.

8. The self-organizing system of claim 1, wherein said network configuration update comprises at least one of:
updating of antenna parameters directed to modify cell coverage in the mobile communication network;
updating of handover thresholds directed to balance traffic load in the mobile communication network;
adding/activating new network nodes in/of the mobile communication network; and
activating new transmission frequencies for nodes of the mobile communication network.

9. The self-organizing system of claim 3, wherein:
said performance data comprises at least one of throughput, delay data, and key performance indicators of the mobile communication network; and
said configuration data comprises at least one of data relating to position of nodes of the mobile communication network, data relating to availability and distribution of current and potential available mobile communication network resources, data regarding a location, number, size and/or position of antennas of nodes of the mobile communication network, priority data, radio related parameters, and data relating to handover relations.

10. The self-organizing system of claim 1, wherein said data being generated and collected outside and independently from the mobile communication network comprise:
event identification data comprising a list of external events and a kind/typology of each listed external event;
event time data comprising, for each external event, at least one of date, starting time, and expected duration of the external event;
event geographical data comprising, for each external event, at least one of geographical location where the external event is scheduled to occur, size of an area interested by the external event, capacity thereof, data about traffic/road conditions and/or public transportation for reaching/leaving the geographical location of the external event;
event attendee data comprising, for each external event, expected number of attendees;
attendee type data comprising, for each external event, typology of the attendees;
historical data comprising, for each external event, information relating at least one of type and number of attendees at past occurrences of the same external event;
social network data comprising, for each external event, social network information relating to said external event; and
weather forecast data, for each external event, comprising information relating to forecasted weather.

11. The self-organizing system of claim 1, wherein said data traffic forecast for the mobile communication network further comprises:
data traffic volume over the mobile communication network relating to said external event;
geographical distribution of said data traffic;
kind of services requested to the mobile communication network by users of user equipment attached to the mobile communication network when the external event will occur; and
uplink and downlink bit rate caused by traffic relating to said external event.

12. The self-organizing system of claim 1, wherein said network configuration update comprises:
updating of antenna parameters directed to modify cell coverage in the mobile communication network;
updating of handover thresholds directed to balance traffic load in the mobile communication network;
adding/activating new network nodes in/of the mobile communication network; and
activating new transmission frequencies for nodes of the mobile communication network.

13. The self-organizing system of claim 1, wherein the circuitry is further configured to cluster the external data to obtain the spatial and time identifiers of said external event and to obtain the corresponding mobile communication network data traffic forecast which is likely to be caused by occurrence of said external event.

14. The self-organizing system of claim 13, wherein the circuitry is further configured to determine correlations between traffic generation characteristics in the external data and forecasted data traffic services based on the clustering of the external data to obtain the spatial and time identifiers of said external event and to obtain the corresponding mobile communication network data traffic forecast which is likely to be caused by occurrence of said external event.

15. A method for automatic optimization of a mobile communication network, comprising:

collecting external data relating to an external event causing gathering of users of user equipment attached to the mobile communication network in a geographical location wherein said external event is scheduled to occur or is occurring, said external data comprising at least one of:
data being generated and collected outside and independently from the mobile communication network, and
data regarding locations of user equipment, attached to the mobile communication network, obtained from or through the mobile communication network;

processing the external data that has been collected to obtain spatial and time identifiers of said external event and to obtain a corresponding mobile communication network data traffic forecast which is likely to be caused by occurrence of said external event;

correlating said spatial and time identifiers, and said data traffic forecast, with internal network data retrieved and/or generated and/or processed within the mobile communication network and relating to the mobile communication network, in order to generate a corresponding network critical issues report listing potential critical issues that can affect the mobile communication network because of data traffic variations caused by the gathering of users of user equipment attached to the mobile communication network when the external event will occur or is occurring;

generating a network configuration update in response to said network critical issues report; and enforcing said network configuration update on the mobile communication network, wherein:

the correlating comprises identifying nodes of the mobile communication network that will be influenced by the external event and identifying when the identified nodes will be influenced by the external event, based on a correlation of the spatial and time identifiers with configuration data indicating configuration of the mobile communication network;

the network critical issues report lists the potential critical issues including:
a determination of future load unbalance of data traffic forecasted among the identified nodes of the mobile communication network interested by said external event,
a future saturation of network resources caused by data traffic forecasted to be generated during the occurrence of said external event, and
a future quality of service deterioration caused by said external event; and the data traffic forecast includes an expected quality of service to be requested, by user equipment from the mobile communication network, when the external event will occur.

16. The method of claim 15, wherein said internal network data comprises performance data regarding performance of the mobile communication network and the configuration data indicating the configuration of the mobile communication network.

17. The method of claim 16, wherein said correlating said spatial and time identifiers, and said data traffic forecast, with internal network data retrieved/generated from/by the mobile communication network comprises:
characterizing from a performance point of view said nodes identified in operation by exploiting said performance data; and
generating said network critical issues report by correlating the characterization of the nodes carried out in operation with said data traffic forecast.

* * * * *